(12) United States Patent
Tian et al.

(10) Patent No.: US 10,213,827 B2
(45) Date of Patent: Feb. 26, 2019

(54) SLAG THICKNESS DETECTION AND SLAG ADDING PREDICTION METHOD AND SYSTEM

(71) Applicant: HUNAN RAMON SCIENCE & TECHNOLOGY CO., LTD., Hunan (CN)

(72) Inventors: Lu Tian, Hunan (CN); Zejun Wen, Hunan (CN)

(73) Assignee: HUNAN RAMON SCIENCE & TECHNOLOGY CO., LTD., Hunan (CN)

( * ) Notice: Subject to any disclaimer, the term of this patent is extended or adjusted under 35 U.S.C. 154(b) by 188 days.

(21) Appl. No.: 15/513,436

(22) PCT Filed: Jun. 10, 2015

(86) PCT No.: PCT/CN2015/081149
§ 371 (c)(1),
(2) Date: Mar. 22, 2017

(87) PCT Pub. No.: WO2016/050095
PCT Pub. Date: Apr. 7, 2016

(65) Prior Publication Data
US 2017/0304889 A1    Oct. 26, 2017

(30) Foreign Application Priority Data
Sep. 29, 2014   (CN) .......................... 2014 1 0512481

(51) Int. Cl.
*B22D 11/18*     (2006.01)
*B22D 2/00*      (2006.01)
(Continued)

(52) U.S. Cl.
CPC .............. *B22D 11/186* (2013.01); *B22D 2/00* (2013.01); *B22D 2/001* (2013.01); *B22D 2/003* (2013.01);
(Continued)

(58) Field of Classification Search
CPC ..... B22D 11/186; B22D 11/108; B22D 11/16; B22D 11/165; B22D 11/18; B22D 11/181; B22D 2/00; B22D 2/001; B22D 2/003
See application file for complete search history.

(56) References Cited

U.S. PATENT DOCUMENTS

| 6,166,681 A * | 12/2000 | Meszaros .............. C21C 5/4673 342/124 |
| 2011/0109496 A1 | 5/2011 | Van Den Berg |
| 2016/0107227 A1 | 4/2016 | Tian et al. |

FOREIGN PATENT DOCUMENTS

| CN | 1261657 A | 8/2000 |
| CN | 1788883 A | 6/2006 |

(Continued)

OTHER PUBLICATIONS

International Search Report and Written Opinion for PCT/CN2015/081149 dated Aug. 26, 2015.

*Primary Examiner* — Kevin P Kerns
*Assistant Examiner* — Steven S Ha
(74) *Attorney, Agent, or Firm* — Pearne & Gordon LLP (57) ABSTRACT

Provided are a method and a system for a slag thickness detection and a slag-adding prediction. The method includes: acquiring real-time measurement data and real-time auxiliary data of a slag point on a surface of a protective slag layer of a casting mold; calculating a real-time slag thickness value corresponding to the slag point by using the real-time measurement data and the real-time auxiliary data of the slag point; and predicting a location on the surface of
(Continued)

the protective slag layer where a slag-adding is to be performed and a slag-adding time when the slag-adding is to be performed based on a change in the real-time slag thickness value corresponding to the slag point by taking a preset slag thickness value as a reference.

16 Claims, 6 Drawing Sheets

(51) Int. Cl.
  *B22D 11/108* (2006.01)
  *G05B 19/048* (2006.01)
(52) U.S. Cl.
  CPC .......... *B22D 11/108* (2013.01); *G05B 19/048* (2013.01); *G05B 2219/23005* (2013.01); *G05B 2219/40623* (2013.01)

(56) References Cited

FOREIGN PATENT DOCUMENTS

| | | | |
|---|---|---|---|
| CN | 102036771 | A | 4/2011 |
| CN | 102397999 | A | 4/2012 |
| CN | 102921913 | A | 2/2013 |
| CN | 103341604 | A | 10/2013 |
| CN | 103406512 | A | 11/2013 |
| CN | 104209480 | A | 12/2014 |
| EP | 0172394 | A1 | 2/1986 |
| JP | 2010172917 | A | 8/2010 |
| SE | 1001200 | A1 | 12/2010 |

* cited by examiner

SLAG THICKNESS DETECTION AND SLAG ADDING PREDICTION METHOD AND SYSTEM

This application is a National Stage application of PCT international patent application PCT/CN2015/081149, filed on Jun. 10, 2015 which claims priority to Chinese Patent Application No. 201410512481.4, titled "SLAG THICKNESS DETECTION AND SLAG ADDING PREDICTION METHOD AND SYSTEM", filed with the Chinese State Intellectual Property Office on Sep. 29, 2014, both of which are incorporated by reference in their entireties herein.

FIELD

The present disclosure relates to the field of converter steelmaking technologies, and in particular to a method and a system for a slag thickness detection and a slag-adding prediction.

BACKGROUND

With a protective slag in a casting mold, a high pull rate on a continuous casting site is achieved, the quality of cast billet can be improved and the number of times of steel leakages can be reduced. In a continuous casting, it is extremely important for improving the quality of cast billet that, the thickness of the protective slag in the casting mold is strictly controlled and the protective slag is added uniformly on a molten steel surface.

At present, generally, the thickness of a protective slag in a slab casting mold on a converter steelmaking continuous casting site is measured in a manual measurement manner, and then a slag-adding is predicted based on the manually-measured thickness. However, the manual measurement has disadvantages such as a large manual workload, a large measuring error and measuring not in real-time and on-line, thus it can not direct a slag-adding efficiently and reliably.

SUMMARY

In view of the above, the object of the present disclosure is to provide a method and a system for a slag thickness detection and a slag-adding prediction, to overcome the disadvantages in conventional technologies that the manual measurement has disadvantages such as a large manual workload, a large measuring error and measuring not in real-time and on-line, hence it can not direct a slag-adding efficiently and reliably.

In order to solve the above technical issue, the present disclosure provides a method for a slag thickness detection and a slag-adding prediction. The method includes:

acquiring real-time measurement data and real-time auxiliary data of a slag point on a surface of a protective slag layer of a casting mold;
calculating a real-time slag thickness value corresponding to the slag point on the surface of the protective slag layer by using the real-time measurement data and the real-time auxiliary data of the slag point; and predicting a location on the surface of the protective slag layer where a slag-adding is to be performed and a slag-adding time when the slag-adding is to be performed based on a change in the real-time slag thickness value corresponding to the slag point on the surface of the protective slag layer by taking a preset slag thickness value as a reference.

Preferably, in the above method, the acquiring the real-time measurement data and the real-time auxiliary data of the slag point on the surface of the protective slag layer of the casting mold includes:

acquiring a real-time distance L from a laser distance meter to a preset measurement point on the surface of the protective slag layer measured by the laser distance meter, and acquiring a rotation angle θ of an electric rotating table when the laser distance meter measures the distance for the preset measurement point, where the laser distance meter is installed on the electric rotating table, and the rotation angle is an angle of a laser emitted by the laser distance meter deviating from a vertical direction; and acquiring a vertical distance D from a bottom of an electromagnetic liquid level meter to a molten steel surface measured by the electromagnetic liquid level meter, acquiring a vertical distance X from the laser distance meter to the bottom of the electromagnetic liquid level meter and acquiring a two-dimensional coordinate of the preset measurement point, where the electromagnetic liquid level meter is installed at a central location inside the casting mold, and an upper edge of the electromagnetic liquid level meter is flush with an upper surface of the casting mold.

Preferably, in the above method, the calculating the real-time slag thickness value d corresponding to the slag point on the surface of the protective slag layer by using the real-time measurement data and the real-time auxiliary data of the slag point includes:

calculating a real-time slag thickness value corresponding to the measurement point based on a formula $d=D-(L\times\cos\theta-X)$ by using the acquired real-time measurement data and the real-time auxiliary data of the measurement point on the protective slag layer.

Preferably, in the above method, the predicting the location on the surface of the protective slag layer where the slag-adding is to be performed and the slag-adding time when the slag-adding is to be performed based on the change in the real-time slag thickness value corresponding to the slag point on the surface of the protective slag layer by taking the preset slag thickness value as a reference includes:

constructing a three-dimensional real-time dynamic model of the protective slag layer with a three-dimensional reconstruction algorithm, based on a real-time two-dimensional coordinate of the preset measurement point and the real-time slag thickness value corresponding to the preset measurement point on the protective slag layer;

calculating a protective slag melting speed corresponding to the preset measurement point by using change in the slag thickness value corresponding to the preset measurement point reflected by the three-dimensional real-time dynamic model; and monitoring, in a real time manner, the slag thickness value corresponding to the preset measurement point on the protective slag layer based on the three-dimensional real-time dynamic model, and predicting the location on the surface of the protective slag layer where the slag-adding is to be performed and the slag-adding time when the slag-adding is to be performed based on the protective slag melting speed corresponding to the preset measurement point by taking the preset slag thickness value as a reference.

Preferably, the above method further includes:

feeding, in a real time manner, a slag thickness value corresponding to a preset measurement point and a prediction result back to a robot arm automatic slag-adding system, where the robot arm automatic slag-adding system performs the slag-adding based on the prediction result.

Moreover, a system for a slag thickness detection and a slag-adding prediction is provided. The system includes:

an acquisition module, configured to acquire real-time measurement data and real-time auxiliary data of a slag point on a surface of a protective slag layer of a casting mold;

a calculation module, configured to calculate a real-time slag thickness value corresponding to the slag point on the surface of the protective slag layer by using the real-time measurement data and the real-time auxiliary data of the slag point; and a prediction module, configured to predict a location on the surface of the protective slag layer where a slag-adding is to be performed and a slag-adding time when the slag-adding is to be performed based on a change in the real-time slag thickness value corresponding to the slag point on the surface of the protective slag layer by taking a preset slag thickness value as a reference.

Preferably, in the above system, the acquisition module includes:

a first acquisition unit, configured to acquire a real-time distance L from a laser distance meter to a preset measurement point on the surface of the protective slag layer measured by the laser distance meter, and acquire a rotation angle θ of an electric rotating table when the laser distance meter measures the distance for the preset measurement point, where the laser distance meter is installed on the electric rotating table, and the rotation angle is an angle of a laser emitted by the laser distance meter deviating from a vertical direction; and a second acquisition unit, configured to acquire a vertical distance D from a bottom of an electromagnetic liquid level meter to a molten steel surface measured by the electromagnetic liquid level meter, acquire a vertical distance X from the laser distance meter to the bottom of the electromagnetic liquid level meter and acquire a real-time two-dimensional coordinate of the preset measurement point, where the electromagnetic liquid level meter is installed at a central location inside the casting mold, and an upper edge of the electromagnetic liquid level meter is flush with an upper surface of the casting mold.

Preferably, in the above system, the calculation module includes:

a calculation unit, configured to calculate a real-time slag thickness value corresponding to the measurement point based on a formula $d=D-(L \times \cos\theta-X)$ by using the acquired real-time measurement data and the real-time auxiliary data of the measurement point on the protective slag layer.

Preferably, in the above system, the prediction module includes:

a model construction unit, configured to construct a three-dimensional real-time dynamic model of the protective slag layer with a three-dimensional reconstruction algorithm, based on the two-dimensional coordinate of the preset measurement point and the real-time slag thickness value corresponding to the preset measurement point on the protective slag layer;

a melting speed calculation unit, configured to calculate a protective slag melting speed corresponding to the preset measurement point by using change in the slag thickness value corresponding to the preset measurement point reflected by the three-dimensional real-time dynamic model; and a result prediction unit, configured to monitor, in a real time manner, the slag thickness value corresponding to the preset measurement point on the protective slag layer based on the three-dimensional real-time dynamic model, and predict the location on the surface of the protective slag layer where the slag-adding is to be performed and the slag-adding time when the slag-adding is to be performed based on the protective slag melting speed corresponding to the preset measurement point by taking the preset slag thickness value as a reference.

Preferably, the above system may further include: a feedback module, configured to feed, in a real time manner, a slag thickness value corresponding to a preset measurement point and a prediction result back to a robot arm automatic slag-adding system, where the robot arm automatic slag-adding system performs the slag-adding based on the prediction result.

As can be seen from the above solutions that, the method and system for the slag thickness detection and the slag-adding prediction disclosed herein include: acquiring real-time measurement data and real-time auxiliary data of a slag point on a surface of a protective slag layer of a casting mold; calculating a real-time slag thickness value corresponding to the slag point on the surface of the protective slag layer by using the real-time measurement data and the auxiliary data of the slag point; and predicting a location on the surface of the protective slag layer where a slag-adding is to be performed and a slag-adding time when the slag-adding is to be performed based on a change in the real-time slag thickness value corresponding to the slag point on the surface of the protective slag layer by taking a preset slag thickness value as a reference. In this case, it is unnecessary to manually measure the slag thickness value of the protective slag layer. Therefore, the technical solutions according to the disclosure overcome disadvantages in the conventional technologies, such as the large manual workload, the large measuring error and measuring not in real-time and on-line. In the technical solutions according to the disclosure, the slag-adding is directed efficiently and reliably.

DETAILED DESCRIPTION OF EMBODIMENTS

In order to further understand the present disclosure, in the following, preferred embodiments of the present disclosure are described with embodiments. However, it should be understood that, these descriptions are only for further illustrating features and advantages of the present disclosure, and are not intended to limit the claims of the present disclosure.

First Embodiment

Figure 1:
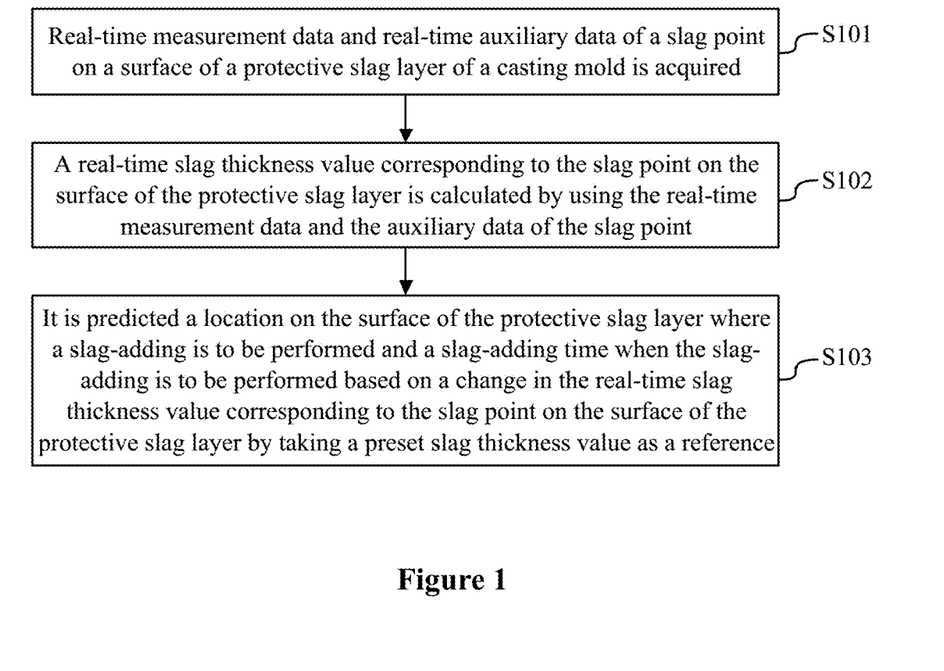
FIG. 1 is a flowchart of a method for a slag thickness detection and a slag-adding prediction according to a first embodiment of the present disclosure.

A method for a slag thickness detection and a slag-adding prediction is disclosed according to the first embodiment of the present disclosure. Referring to FIG. 1, the method includes steps S101 to S103.

In step S101, real-time measurement data and real-time auxiliary data of a slag point on a surface of a protective slag layer of a casting mold is acquired.

Step S101 includes:

acquiring a real-time distance L from a laser distance meter to a preset measurement point on the surface of the protective slag layer measured by the laser distance meter, and acquiring a rotation angle θ of an electric rotating table when the laser distance meter measures the distance for the preset measurement point, where the laser distance meter is installed on the electric rotating table, and the rotation angle is an angle of a laser emitted by the laser distance meter deviating from a vertical direction, that is, acquiring the real-time measurement data of the slag point in this step; and acquiring a vertical distance D from a bottom of an electromagnetic liquid level meter to a molten steel surface measured by the electromagnetic liquid level meter, acquiring a vertical distance X from the laser distance meter to the bottom of the electromagnetic liquid level meter and acquiring a two-dimensional coordinate of the preset measurement point, where the electromagnetic liquid level meter is installed at a central location inside the casting mold, and an upper edge of the electromagnetic liquid level meter is flush with an upper surface of the casting mold, that is, acquiring the real-time auxiliary data in this step.

In step S102, a real-time slag thickness value corresponding to the slag point on the surface of the protective slag layer is calculated by using the real-time measurement data and the real-time auxiliary data of the slag point.

In step S102, particularly, a real-time slag thickness value corresponding to the measurement point is calculated based on a formula $d=D-(L \times \cos \theta - X)$ by using the acquired real-time measurement data and the real-time auxiliary data of the measurement point on the protective slag layer.

In step S103, it is predicted a location on the surface of the protective slag layer where a slag-adding is to be performed and a slag-adding time when the slag-adding is to be performed based on a change in the real-time slag thickness value corresponding to the slag point on the surface of the protective slag layer by taking a preset slag thickness value as a reference.

Step S103 may include:

constructing a three-dimensional real-time dynamic model of the protective slag layer with a three-dimensional reconstruction algorithm, based on the two-dimensional coordinate of the preset measurement point and the real-time slag thickness value corresponding to the preset measurement point on the protective slag layer;

calculating a protective slag melting speed corresponding to the preset measurement point by using change in the slag thickness value corresponding to the preset measurement point reflected by the three-dimensional real-time dynamic model; and monitoring, in a real time manner, the slag thickness value corresponding to the preset measurement point on the protective slag layer based on the three-dimensional real-time dynamic model, and predicting the location on the surface of the protective slag layer where the slag-adding is to be performed and the slag-adding time when the slag-adding is to be performed based on the protective slag melting speed corresponding to the preset measurement point by taking the preset slag thickness value as a reference.

Specifically, in the embodiment, a processing logic of the method according to the present disclosure is implemented in form of a software program, corresponding control device and detection device are arranged at a front end to achieve automatic measurement and acquisition of various required data. In the following, the method according to the present disclosure is described in detail by describing data acquisition and data processing of the control device, detection device and processing software. And the adopted processing software is installed in an upper computer.

Firstly, the adopted detection device and control device are described.

The adopted detection device includes a measuring and adjusting apparatus and a laser measuring apparatus. The measuring and adjusting apparatus includes an electric slid plate for a translation positioning and an electric rotating table for a rotation positioning. The electric rotating table is installed on the electric slid plate, and may achieve a two-dimensional positioning of a measurement point by cooperating with the electric slip plate. The electric slip plate may be driven by a stepper motor and the electric rotating table may be driven by a servo motor. The laser measuring apparatus may be a laser distance meter with a high precision which is installed on the electric rotating table. The laser distance meter can perform a multi-point and multi-location measurement on the real-time data of the protective slag layer with the two-dimensional positioning by the measuring and adjusting apparatus.

In the embodiment, the laser distance meter may be a high-temperature laser distance meter which can perform an online measurement on a black protective slag with high temperature accurately in a real time manner without being affected by dusts, a high temperature and a flame on the site. The high-temperature laser distance meter may measure the entire protective slag layer in a scanning manner by cooperating with the positioning by the measuring and adjusting apparatus.

The detection device may further include an electromagnetic liquid level meter for measuring a distance from the bottom of the electromagnetic liquid level meter to a molten steel surface.

A dust prevention and cooling design is adopted in the detection device to protect components included in the detection device. An independent dust prevention and cooling protection cover is installed for each of the laser distance meter, the electric slip plate and the electric rotating table. The dust prevention and cooling of the laser distance meter is achieved by compressing air, and an air inlet and an air outlet are arranged on the dust prevention and cooling protection cover of the laser distance meter. An air inlet is arranged on the dust prevention and cooling protection cover of the electric rotating table, while an air outlet of the dust prevention and cooling protection cover of the electric rotating table is a gap between the table and the protection cover. Dusts are prevented from entering the protection cover based on a principle that a pressure inside the protection cover is greater than a pressure outside of the protection cover, and a corresponding device is cooled by a circulation of compressed air in the protection cover. In order to ensure that the entire device to operate normally on the site, an anti-collision design is added for the electric rotating table and laser distance meter, that is, an anti-collision protection cover is arranged outside of the electric rotating table and laser distance meter. In this case, the device can be prevented from being damaged due to a molten steel splashing, and a collision from other objects can also be prevented.

The control device full-automatically controls a detection process of the detection device with Programmable Logic Controller (PLC). For example, the control device sets positioning speeds, directions and zero-back modes of the servo motor and the stepper motor, a start-stop control of a device on the site, a signal acquisition and a safety interlock of a control logic.

Figure 3:
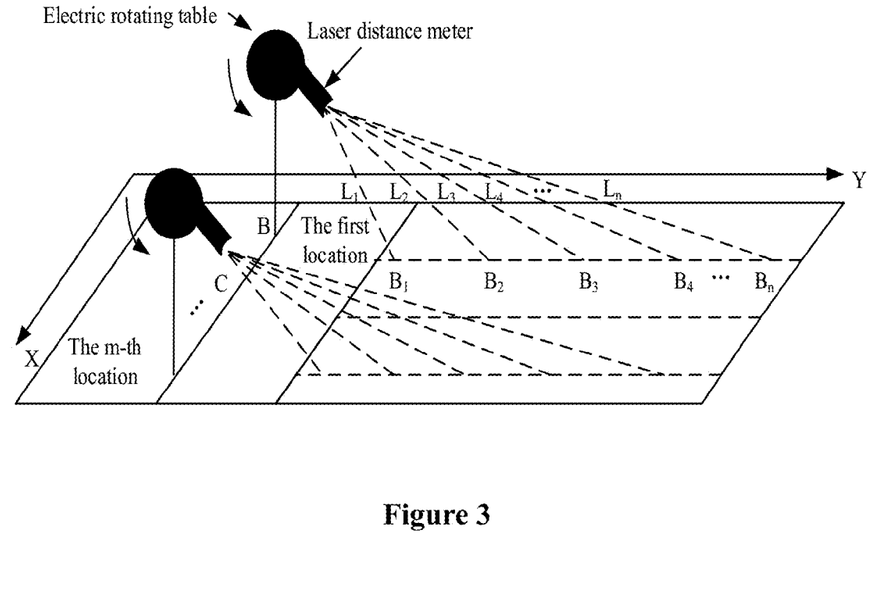
FIG. 3 is a schematic diagram of a selection of a preset measurement point according to the first embodiment of the present disclosure.

In an installation, it is required to install the electromagnetic liquid level meter at a central location inside the casting mold, with an upper edge of the electromagnetic liquid level meter being flush with an upper surface of the casting mold. And as shown in FIG. 3, it is required that a vertical distance from a zero point of the laser distance meter to a bottom of the electromagnetic liquid level meter is a constant value X. The electric rotating table is installed on the electric slip plate and the laser distance meter is installed on the electric rotating table. And a moving path of the electric slip plate is defined, hence a translation positioning is achieved via a slipping of the electric slip plate along an X-axis in FIG. 3. Before a measurement, the electric slip plate stays at an original location and the electric rotating table stays at a location of a calibrated zero scale (that is, a scale corresponding to the electric rotating table when the laser distance meter is perpendicular to the ground).

Figure 2:
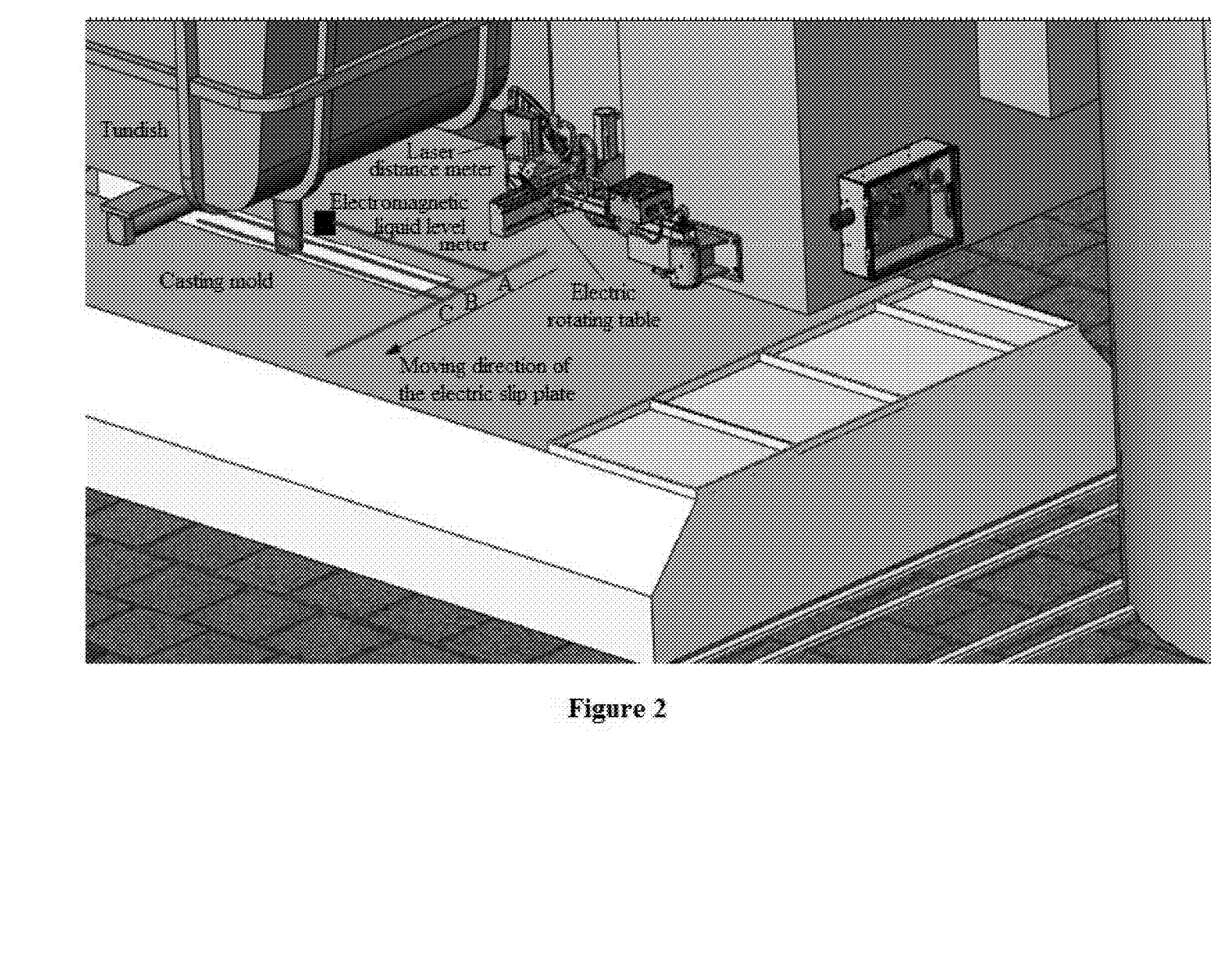
FIG. 2 is a schematic diagram of an on-site installation of a detection system according to the first embodiment of the present disclosure.

Moreover, a series of measurement points are preset on the protective slag layer, as shown in FIG. 2. In the embodiment, m positioning locations are uniformly set on the X-axis for the electric slip plate while n positioning locations are uniformly set on a Y-axis for the electric rotating table. That is, m×n measurement points are uniformly set on the protective slag layer. In a subsequent measurement, the laser distance meter may make a laser emitted from itself hit the measurement point based on a two-dimensional positioning by the electric slip plate and the electric rotating table, thereby measuring required data.

In order to ensure a high accuracy of a prediction result such as a slag-adding location and a slag-adding time, the measurement points may be set as dense as possible, that is, numeric values of m and n may be set as great as possible. In this case, a coverage measurement is performed completely on the protective slag layer in a scanning manner. The higher the density of the set measurement points is, the higher the accuracy of a final prediction result is.

In the case that it is required to detect a slag thickness in a real time manner, in response to an indication of the upper computer, the control device controls the detection device to detect corresponding data in a real time manner.

Before performing a measurement, the system is located at a zero location, that is, the electric rotating table stays at a location of a calibrated zero scale and the electric slip plate stays at a location of a zero point. Firstly, the detection device is started. The electric slip plate is controlled to be positioned to a point A in FIG. 2. At this time, a pulse is provided to the servo motor, to rotate the electric rotating table for an angle until a laser from the laser distance meter hits the electromagnetic liquid level meter of the casting mold. In this case, a value $L_0$ of the laser distance meter and an angle value $\theta_0$ for which the rotating table rotates are recorded. In the case that the measurement is completed, an equal reverse pulse is provided to the servo motor to return the electric rotating table to the location of the calibrated zero scale. So far, the measurement at the point A is completed.

Next, a pulse is provided to the stepper motor to position the electric slip plate to a point B in FIG. 3. And a pulse is provided to the servo motor to rotate the electric rotating table for an angle $\theta_1$. In this case, a laser from the laser distance meter hits a measurement point $B_1$. The control device records a two-dimensional coordinate of the $B_1$. The laser distance meter performs a laser distance measurement, that is, acquires a distance $L_1$ between a light source point (taking the laser distance meter itself as the light source point) and the measurement point $B_1$. The upper computer acquires the distance data $L_1$ measured by the laser distance meter with an analog input module (analog-digital conversion) of PLC, and moreover, acquires the rotation angle $\theta_1$ of the electric rotating table and the recorded two-dimensional coordinate. So far, the measurement at the point $B_1$ is completed.

Next, the electric rotating table is controlled to continuously rotate for an angle $\theta_2$. In this case, a laser from the laser distance meter hits a measurement point $B_2$. The upper computer acquires distance data $L_2$ measured by the laser distance meter, and acquires a rotation angle $(\theta_1+\theta_2)$ of the electric rotating table and a two-dimensional coordinate of $B_2$. Hence a measurement at the point $B_2$ is completed. Then, the electric rotating table is continuously controlled to rotate for an angle $\theta_3, \ldots$ , the above process is repeated, until n measurement points $B_1, B_2, \ldots B_n$ corresponding to the positioning location B are measured. In this case, a reverse pulse is provided to the servo motor to make the electric rotating table return to the location of the calibrated zero scale.

After the n measurement points corresponding to the point B are measured, the control device provides a pulse to the stepper motor to position the electric slip plate to a point C, to measure n measurement points $C_1, C_2, \ldots C_n$ corresponding to the position location C. Then measurements are performed successively in the above way, until m×n measurement points corresponding to the electric rotating table at m position location are all measured. The electric rotating table returns to the location of the calibrated zero scale, the electric slip plate returns to the location of the zero point. In this case, the system is zeroed back, that is, an entire scanning measurement of the protective slag layer is completed.

The detection device is controlled by the control device to repeat the above scanning measurement on the protective slag layer, thereby achieving a real-time measurement on the data of the protective slag layer.

Figure 4:
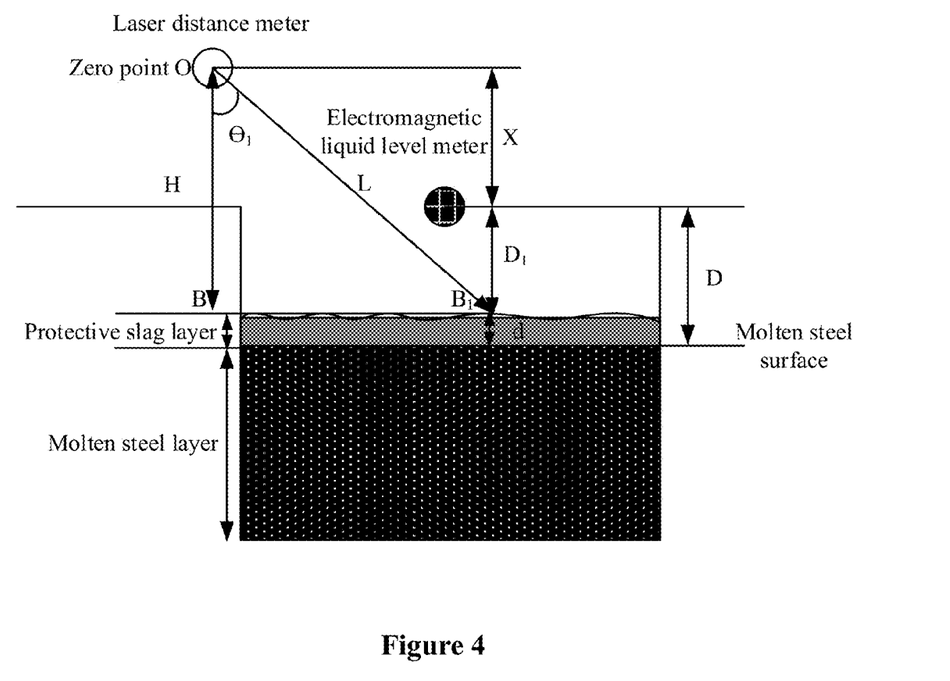
FIG. 4 is a schematic perspective view of a slag thickness value calculation according to the first embodiment of the present disclosure.

Moreover, referring to FIG. 4, the electromagnetic liquid level meter monitors the molten steel surface in a real time manner and measures a real-time vertical distance D from the bottom of the electromagnetic liquid level meter to the molten steel surface. The upper computer directly reads a molten steel level value measured by the electromagnetic liquid level meter from a PLC control system of a steel mill via industrial Ethernet.

Based on this, the upper computer calculates a real-time slag thickness value d corresponding to the measurement point based on a formula $d=D-(L \times \cos \theta - X)$, where $X=L_0 \times \cos \theta_0$, by using the real-time data corresponding to the m×n measurement points, i.e. the distance data L measured by the laser distance meter, the rotation angle $\theta$ of the electric rotating table, the vertical distance X from the laser distance meter to the bottom of the electromagnetic liquid level meter and the real-time vertical distance D from the bottom of the electromagnetic liquid level meter to the molten steel surface. And the upper computer may acquire the required measurement data in a real time manner by reading the measurement data uploaded by a control device to a database in a real time manner.

After calculating the real-time slag thickness values corresponding to the measurement points, the upper computer constructs a three-dimensional real-time dynamic model of the protective slag layer with a three-dimensional reconstruction algorithm based on two-dimensional coordinates and the slag thickness values corresponding to the measurement points (taking the slag thickness values as numeric values on a Z-axis), and displays the three-dimensional dynamic model in a monitoring interface of the upper computer. Moreover, the upper computer monitors in a real time manner changes in the slag thickness values corresponding to the preset measurement points based on the constructed three-dimensional real-time dynamic module, renders and displays slag thickness curves corresponding to the respective measurement points, and calculates slag melting speeds (melting speeds of the protective slags) corresponding to the respective measurement points of the protective slag layer based on the changes in the slag thickness values reflected by the slag thickness curves. Finally, by taking a preset slag thickness value as a reference, the upper computer predicts a location on the surface of the protective slag layer where a slag-adding is to be performed and a slag-adding time when the slag-adding is to be performed based on the slag melting speeds corresponding to the respective measurement points.

In a particular application of the present disclosure, an interlock control of PLC program may be performed based on a size of an on-site pouring cross-section. The control device may automatically select and configure pre-integrated parameters based on a size of an on-site pouring cross-section set by the upper computer. For example, the control device configures a time interval between different measurements, positioning parameters of the electric slip plate, a range of a scanning angle and a step angle of the electric rotating table. Further, a full-automatic cycle detection of the protective slag layer measurement is achieved based on the configured parameters.

In the case that a certain device in the detection system is failure, for example, the servo motor driver is failure, it is prompted with an alarm indication lamp on an operation panel and prompted with an alarm on the monitoring interface of the upper computer. In a measurement process of the system, in the case that a slag thickness value corresponding to a certain measurement point of the protective slag layer is overgreat or oversmall, it may be prompted on the operation panel with a corresponding alarm prompt and prompted in the monitoring interface of the upper computer with a corresponding alarm prompt. And coordinate information of the measurement point is provided to control the thickness of the entire protective slag layer to be always in a process requirement range.

As can be seen from the above solutions that, the method for the slag thickness detection of the protective slag disclosed herein include: acquiring real-time measurement data and real-time auxiliary data of a slag point on a surface of a protective slag layer of a casting mold; calculating a real-time slag thickness value corresponding to the slag point on the surface of the protective slag layer by using the real-time measurement data and the auxiliary data of the slag point; and predicting a location on the surface of the protective slag layer where a slag-adding is to be performed and a slag-adding time when the slag-adding is to be performed based on a change in the real-time slag thickness value corresponding to the slag point on the surface of the protective slag layer by taking a preset slag thickness value as a reference. In this case, it is unnecessary to manually measure the slag thickness value of the protective slag layer. Therefore, the technical solutions according to the disclosure overcome disadvantages in the conventional technologies, such as the large manual workload, the large measuring error and measuring not in real-time and on-line. In the technical solutions according to the disclosure, the slag-adding is directed efficiently and reliably.

Second Embodiment

Figure 5:
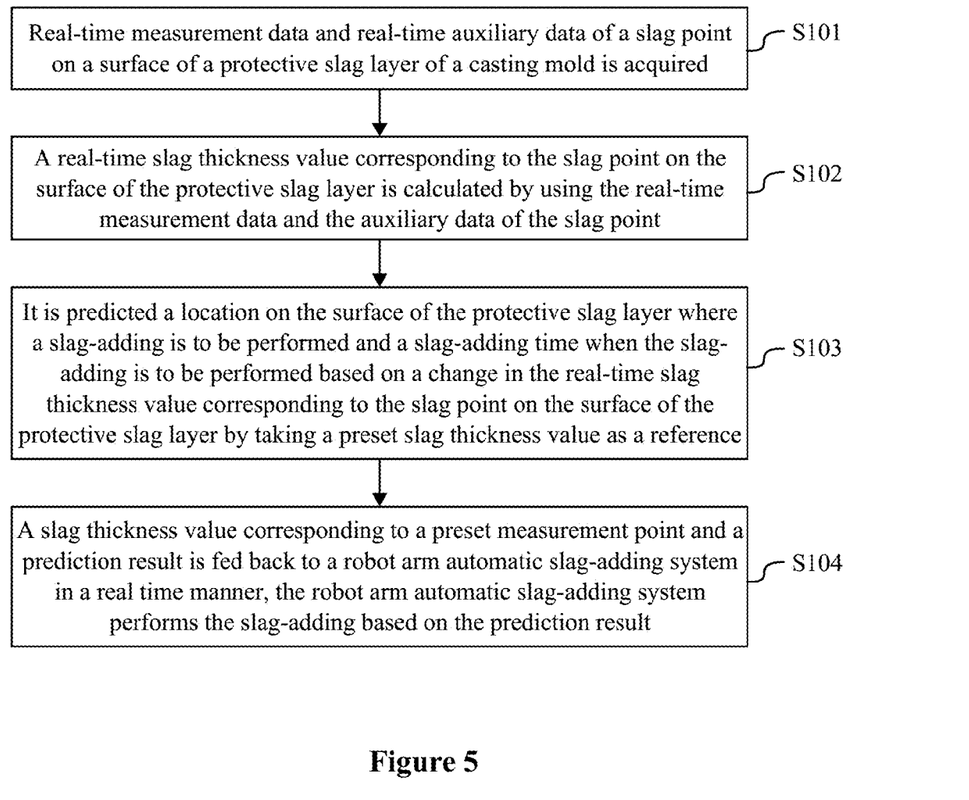
FIG. 5 is a flowchart of a method for a slag thickness detection and a slag-adding prediction according to a second embodiment of the present disclosure.

Referring to FIG. 5, in the embodiment, the method may further include step S104. In step S104, a slag thickness value corresponding to a preset measurement point and a prediction result is fed back to a robot arm automatic slag-adding system in a real time manner, the robot arm automatic slag-adding system performs the slag-adding based on the prediction result.

In the conventional technologies, a slag-adding is performed by referring to manually-measured slag thickness data. Thus, a real-time online measurement may not be achieved, and a closed-loop control from a slag thickness measurement, a slag-adding prediction to a slag-adding implementation may not be achieved. Therefore, it can not be effectively controlled the thickness of the protective slag layer inside the casting mold on a converter steelmaking continuous casting site, thereby affecting the quality of the cast billet.

In reverse, in the second embodiment, based on an achieved full-automatic real-time detection of slag thickness, it may be achieved the closed-loop control from the slag thickness prediction to the slag-adding implementation by feeding information such as online slag thickness information, a slag-adding location and a slag-adding time in the prediction result back to the robot arm automatic slag-adding system, thereby ensuring an uniform slag-adding, and further improving the quality of the cast billet.

Third Embodiment

A system for a slag thickness detection and a slag-adding prediction is disclosed according to the third embodiment. And the system corresponds to the method disclosed in the first and second embodiments.

Figure 6:
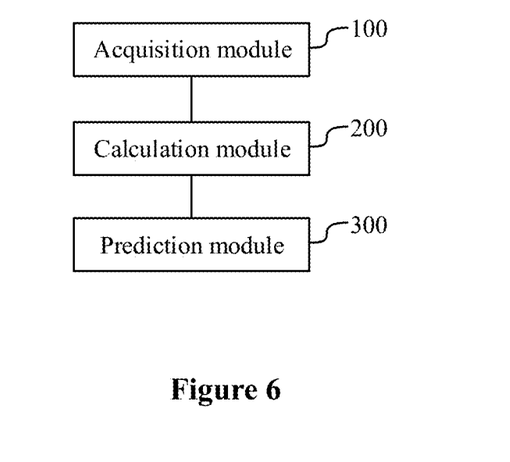
FIG. 6 is a schematic structural diagram of a system for a slag thickness detection and a slag-adding prediction according to a third embodiment of the present disclosure.

Firstly, corresponding to the first embodiment, referring to FIG. 6, the system includes an acquisition module 100, a calculation module 200 and a prediction module 300.

The acquisition module 100 is configured to acquire real-time measurement data and real-time auxiliary data of a slag point on a surface of a protective slag layer of a casting mold.

The acquisition module 100 may include a first acquisition unit and a second acquisition unit. The first acquisition unit is configured to: acquire a real-time distance L from a laser distance meter to a preset measurement point on the surface of the protective slag layer measured by the laser distance meter; and acquire a rotation angle θ of an electric rotating table when the laser distance meter measures the distance for the preset measurement point, where the laser distance meter is installed on the electric rotating table, and the rotation angle is an angle of a laser emitted by the laser distance meter deviating from a vertical direction. The second acquisition unit is configured to: acquire a vertical distance D from a bottom of an electromagnetic liquid level meter to a molten steel surface measured by the electromagnetic liquid level meter; acquire a vertical distance X from the laser distance meter to the bottom of the electromagnetic liquid level meter; and acquire a real-time two-dimensional coordinate of the preset measurement point, where the electromagnetic liquid level meter is installed at a central location inside the casting mold, and an upper edge of the electromagnetic liquid level meter is flush with an upper surface of the casting mold.

The calculation module 200 is configured to calculate a real-time slag thickness value corresponding to the slag point on the surface of the protective slag layer by using the real-time measurement data and the real-time auxiliary data of the slag point.

The acquisition module 200 may include an acquisition unit configured to calculate a real-time slag thickness value corresponding to the measurement point based on a formula $d=D-(L\times\cos\theta-X)$ by using the acquired real-time measurement data and the real-time auxiliary data of the measurement point on the protective slag layer.

The prediction module 300 is configured to predict a location on the surface of the protective slag layer where a slag-adding is to be performed and a slag-adding time when the slag-adding is to be performed based on a change in the real-time slag thickness value corresponding to the slag point on the surface of the protective slag layer by taking a preset slag thickness value as a reference.

The prediction module 300 may include a model construction unit, a melting speed calculation unit and a result prediction unit. The model construction unit is configured to construct a three-dimensional real-time dynamic model of the protective slag layer with a three-dimensional reconstruction algorithm, based on the two-dimensional coordinate of the preset measurement point and the real-time slag thickness value corresponding to the preset measurement point on the protective slag layer. The melting speed calculation unit is configured to calculate a protective slag melting speed corresponding to the preset measurement point by using change in the slag thickness value corresponding to the preset measurement point reflected by the three-dimensional real-time dynamic model. The result prediction unit is configured to monitor, in a real time manner, the slag thickness value corresponding to the preset measurement point on the protective slag layer based on the three-dimensional real-time dynamic model, and predict the location on the surface of the protective slag layer where the slag-adding is to be performed and the slag-adding time when the slag-adding is to be performed based on the protective slag melting speed corresponding to the preset measurement point by taking the preset slag thickness value as a reference.

Figure 7:
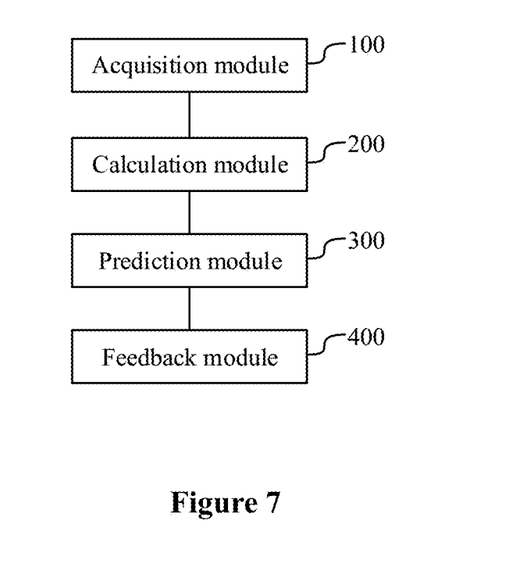
FIG. 7 is another schematic structural diagram of a system for a slag thickness detection and a slag-adding prediction according to the third embodiment of the present disclosure.

Corresponding to the second embodiment, as shown in FIG. 7, the system may further include a feedback module 400 configured to feed, in a real time manner, a slag thickness value corresponding to a preset measurement point and a prediction result back to a robot arm automatic slag-adding system, where the robot arm automatic slag-adding system performs the slag-adding based on the prediction result.

The system for the slag thickness detection and slag-adding prediction according to the third embodiment of the present disclosure is described briefly since it corresponds to the method for the slag thickness detection and slag-adding prediction according to the first and second embodiments. Related or similar parts may refer to corresponding descriptions in the method for the slag thickness detection and slag-adding prediction in the first and second embodiments, and are not described in detail herein.

In conclusion, in the present disclosure, the thickness of the protective slag is monitored in real-time and on-line, and the closed-loop control from the slag thickness prediction to the slag-adding implementation is achieved by feeding the real-time online slag thickness information back to a corresponding robot arm automatic slag-adding system, thereby ensuring an uniform slag-adding and improving the quality of cast billet.

It should be noted that, various embodiments in the specification are described in a progressive way, each embodiment lays emphasis on difference from other embodiments, and for the same or similar parts between various embodiments, one may refer to the description of other embodiments.

It can be known by those skilled in the art based on the description of the above embodiments that the present application can be realized by software and necessary common hardware platform. Based on this understanding, the technical solution of the present application or a part of the technical solution of the present application contributing to the conventional technology may be embodied in a software product way, the computer software product may be stored in a storage medium, such as ROM/RAM, diskette or an optical disk, which includes several instructions to enable a computer device (may be a personal computer, a server or a network device) to perform the method described in each embodiment or in some parts of the embodiment of the present application.

Those described above are only preferred embodiments of the present disclosure. It should be noted that, for those skilled in the art, improvements and modifications may also be made without departing from the principle of the present disclosure. These improvements and modifications should also be included in the protection scope of the present disclosure.

What is claimed is:

1. A method for a slag thickness detection and a slag-adding prediction, comprising:
    acquiring real-time measurement data and real-time auxiliary data of a slag point on a surface of a protective slag layer of a casting mold;
    calculating a real-time slag thickness value corresponding to the slag point on the surface of the protective slag layer by using the real-time measurement data and the real-time auxiliary data of the slag point; and
    predicting a location on the surface of the protective slag layer where a slag-adding is to be performed and a slag-adding time when the slag-adding is to be performed based on a change in the real-time slag thickness value corresponding to the slag point on the surface of the protective slag layer by taking a preset slag thickness value as a reference.

2. The method according to claim 1, wherein the acquiring the real-time measurement data and the real-time auxiliary data of the slag point on the surface of the protective slag layer of the casting mold comprises:
    acquiring a real-time distance L from a laser distance meter to a preset measurement point on the surface of the protective slag layer measured by the laser distance meter, and acquiring a rotation angle $\theta$ of an electric rotating table when the laser distance meter measures the distance for the preset measurement point, wherein the laser distance meter is installed on the electric rotating table, and the rotation angle is an angle of a laser emitted by the laser distance meter deviating from a vertical direction; and acquiring a vertical distance D from a bottom of an electromagnetic liquid level meter to a molten steel surface measured by the electromagnetic liquid level meter, acquiring a vertical distance X from the laser distance meter to the bottom of the electromagnetic liquid level meter and acquiring a two-dimensional coordinate of the preset measurement point, wherein the electromagnetic liquid level meter is installed at a central location inside the casting mold, and an upper edge of the electromagnetic liquid level meter is flush with an upper surface of the casting mold.

3. The method according to claim 2, wherein the calculating the real-time slag thickness value d corresponding to the slag point on the surface of the protective slag layer by using the real-time measurement data and the real-time auxiliary data of the slag point comprises:

calculating a real-time slag thickness value corresponding to the measurement point based on a formula $d=D-(L \times \cos \theta - X)$ by using the acquired real-time measurement data and the real-time auxiliary data of the measurement point on the protective slag layer.

4. The method according to claim 3, wherein the predicting the location on the surface of the protective slag layer where the slag-adding is to be performed and the slag-adding time when the slag-adding is to be performed based on the change in the real-time slag thickness value corresponding to the slag point on the surface of the protective slag layer by taking the preset slag thickness value as a reference comprises:

constructing a three-dimensional real-time dynamic model of the protective slag layer with a three-dimensional reconstruction algorithm, based on the two-dimensional coordinate of the preset measurement point and the real-time slag thickness value corresponding to the preset measurement point on the protective slag layer;

calculating a protective slag melting speed corresponding to the preset measurement point by using change in the slag thickness value corresponding to the preset measurement point reflected by the three-dimensional real-time dynamic model; and monitoring, in a real time manner, the slag thickness value corresponding to the preset measurement point on the protective slag layer based on the three-dimensional real-time dynamic model, and predicting the location on the surface of the protective slag layer where the slag-adding is to be performed and the slag-adding time when the slag-adding is to be performed based on the protective slag melting speed corresponding to the preset measurement point by taking the preset slag thickness value as a reference.

5. The method according to claim 4, further comprising: feeding, in a real time manner, a slag thickness value corresponding to a preset measurement point and a prediction result back to a robot arm automatic slag-adding system, wherein the robot arm automatic slag-adding system performs the slag-adding based on the prediction result.

6. The method according to claim 1, further comprising: feeding, in a real time manner, a slag thickness value corresponding to a preset measurement point and a prediction result back to a robot arm automatic slag-adding system, wherein the robot arm automatic slag-adding system performs the slag-adding based on the prediction result.

7. The method according to claim 2, further comprising: feeding, in a real time manner, a slag thickness value corresponding to a preset measurement point and a prediction result back to a robot arm automatic slag-adding system, wherein the robot arm automatic slag-adding system performs the slag-adding based on the prediction result.

8. The method according to claim 3, further comprising: feeding, in a real time manner, a slag thickness value corresponding to a preset measurement point and a prediction result back to a robot arm automatic slag-adding system, wherein the robot arm automatic slag-adding system performs the slag-adding based on the prediction result.

9. A system for a slag thickness detection and a slag-adding prediction, comprising:

an acquisition module, configured to acquire real-time measurement data and real-time auxiliary data of a slag point on a surface of a protective slag layer of a casting mold;

a calculation module, configured to calculate a real-time slag thickness value corresponding to the slag point on the surface of the protective slag layer by using the real-time measurement data and the real-time auxiliary data of the slag point; and a prediction module, configured to predict a location on the surface of the protective slag layer where a slag-adding is to be performed and a slag-adding time when the slag-adding is to be performed based on a change in the real-time slag thickness value corresponding to the slag point on the surface of the protective slag layer by taking a preset slag thickness value as a reference.

10. The system according to claim 9, wherein the acquisition module comprises:

a first acquisition unit, configured to acquire a real-time distance L from a laser distance meter to a preset measurement point on the surface of the protective slag layer measured by the laser distance meter, and acquire a rotation angle θ of an electric rotating table when the laser distance meter measures the distance for the preset measurement point, wherein the laser distance meter is installed on the electric rotating table, and the rotation angle is an angle of a laser emitted by the laser distance meter deviating from a vertical direction; and a second acquisition unit, configured to acquire a vertical distance D from a bottom of an electromagnetic liquid level meter to a molten steel surface measured by the electromagnetic liquid level meter, acquire a vertical distance X from the laser distance meter to the bottom of the electromagnetic liquid level meter and acquire a two-dimensional coordinate of the preset measurement point, wherein the electromagnetic liquid level meter is installed at a central location inside the casting mold, and an upper edge of the electromagnetic liquid level meter is flush with an upper surface of the casting mold.

11. The system according to claim 10, wherein the calculation module comprises:

a calculation unit, configured to calculate a real-time slag thickness value corresponding to the measurement point based on a formula $d=D-(L \times \cos \theta - X)$ by using the acquired real-time measurement data and the real-time auxiliary data of the measurement point on the protective slag layer.

12. The system according to claim 11, wherein the prediction module comprises:

a model construction unit, configured to construct a three-dimensional real-time dynamic model of the protective slag layer with a three-dimensional reconstruction algorithm, based on a real-time two-dimensional coordinate of the preset measurement point and the real-time slag thickness value corresponding to the preset measurement point on the protective slag layer;
a melting speed calculation unit, configured to calculate a protective slag melting speed corresponding to the preset measurement point by using change in the slag thickness value corresponding to the preset measurement point reflected by the three-dimensional real-time dynamic model; and
a result prediction unit, configured to monitor, in a real time manner, the slag thickness value corresponding to the preset measurement point on the protective slag layer based on the three-dimensional real-time dynamic model, and predict the location on the surface of the protective slag layer where the slag-adding is to be performed and the slag-adding time when the slag-adding is to be performed based on the protective slag melting speed corresponding to the preset measurement point by taking the preset slag thickness value as a reference.

13. The system according to claim 12, further comprising:
a feedback module, configured to feed, in a real time manner, a slag thickness value corresponding to a preset measurement point and a prediction result back to a robot arm automatic slag-adding system, wherein the robot arm automatic slag-adding system performs the slag-adding based on the prediction result.

14. The system according to claim 9, further comprising:
a feedback module, configured to feed, in a real time manner, a slag thickness value corresponding to a preset measurement point and a prediction result back to a robot arm automatic slag-adding system, wherein the robot arm automatic slag-adding system performs the slag-adding based on the prediction result.

15. The system according to claim 10, further comprising:
a feedback module, configured to feed, in a real time manner, a slag thickness value corresponding to a preset measurement point and a prediction result back to a robot arm automatic slag-adding system, wherein the robot arm automatic slag-adding system performs the slag-adding based on the prediction result.

16. The system according to claim 11, further comprising:
a feedback module, configured to feed, in a real time manner, a slag thickness value corresponding to a preset measurement point and a prediction result back to a robot arm automatic slag-adding system, wherein the robot arm automatic slag-adding system performs the slag-adding based on the prediction result.

* * * * *